M. K. SERAILIAN.
METHOD OF CONCENTRATING LIQUIDS.
APPLICATION FILED OCT. 2, 1913.
1,237,962.
Patented Aug. 21, 1917.
2 SHEETS—SHEET 1.
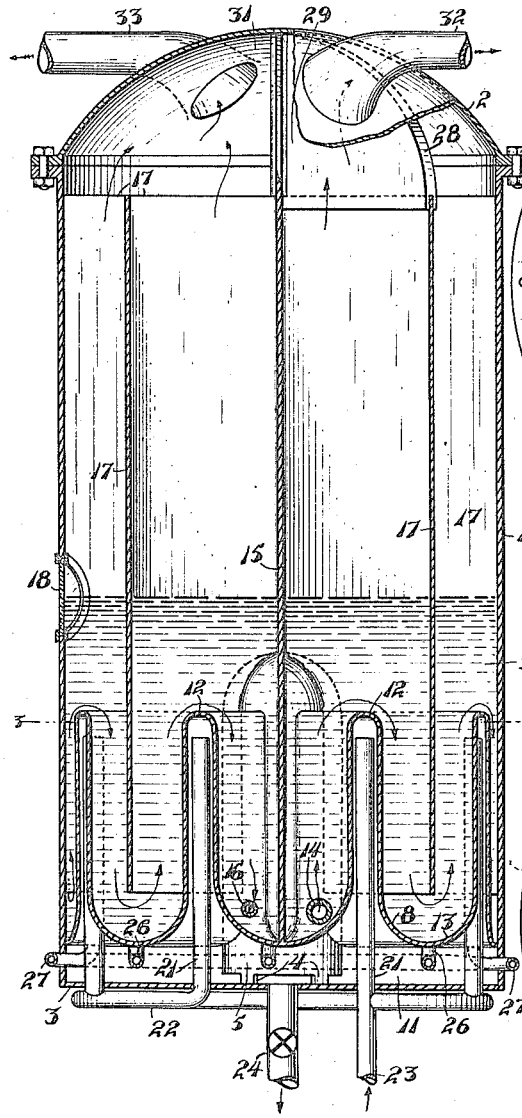
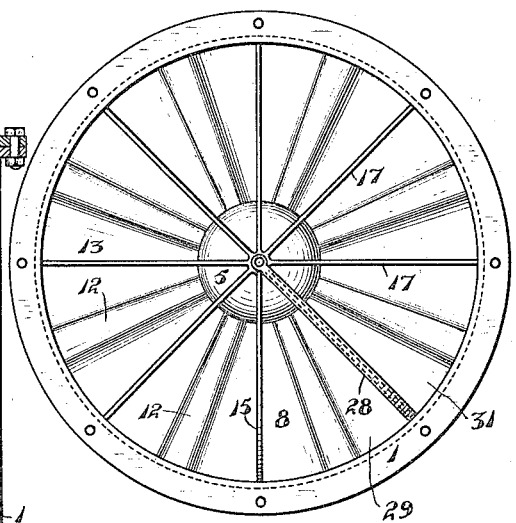
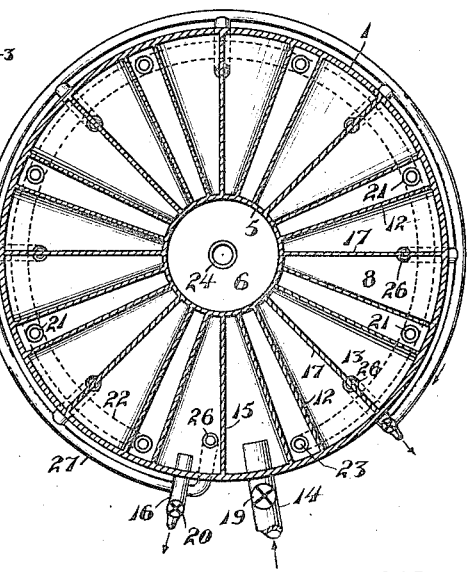
WITNESSES:
INVENTOR.
Mihran K. Serailian
BY
ATTORNEY

UNITED STATES PATENT OFFICE.

MIHRAN K. SERAILIAN, OF BERKELEY, CALIFORNIA.

METHOD OF CONCENTRATING LIQUIDS.

1,237,962.  Specification of Letters Patent.  Patented Aug. 21, 1917.

Application filed October 2, 1913. Serial No. 792,953.

*To all whom it may concern:*

Be it known that I, MIHRAN K. SERAILIAN, a citizen of the United States, residing at Berkeley, in the county of Alameda and State of California, have invented new and useful Improvements in Methods of Concentrating Liquids, of which the following is a specification.

My invention relates to improvements in method of concentrating liquids, the object of the invention being to provide such a method especially adapted for continuously evaporating or concentrating fruit juices, by which the aroma or flavor of the juices will be all preserved and may be added to the residual syrup.

Figure 4:
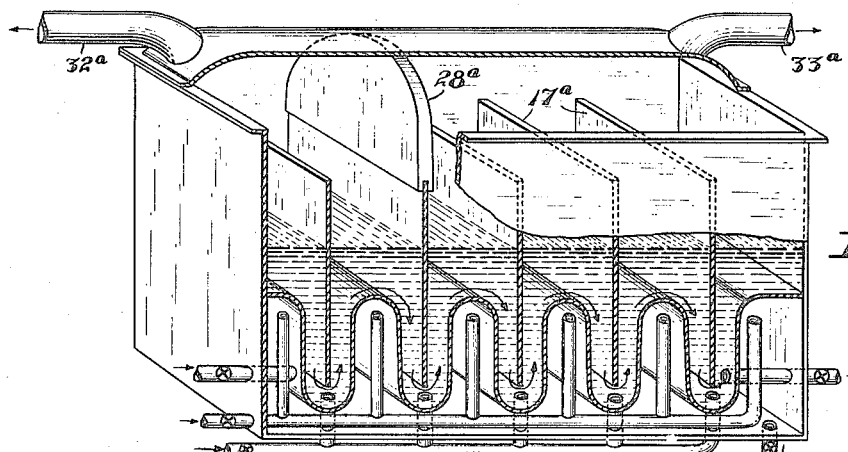
Figure 5:
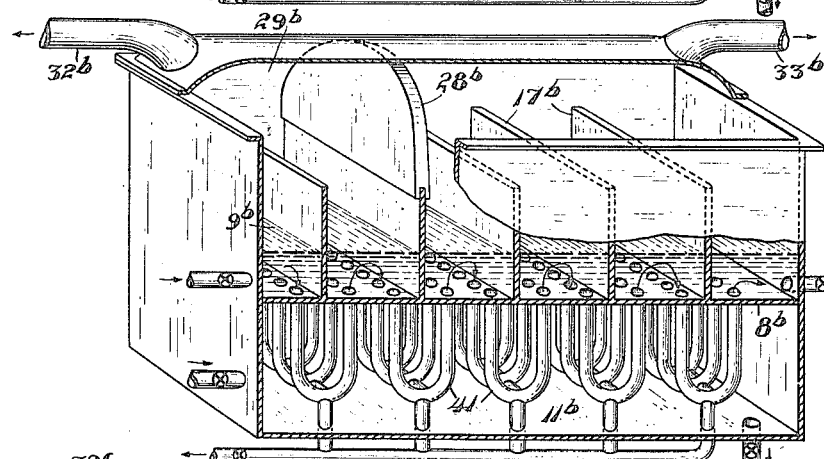
Figure 6:
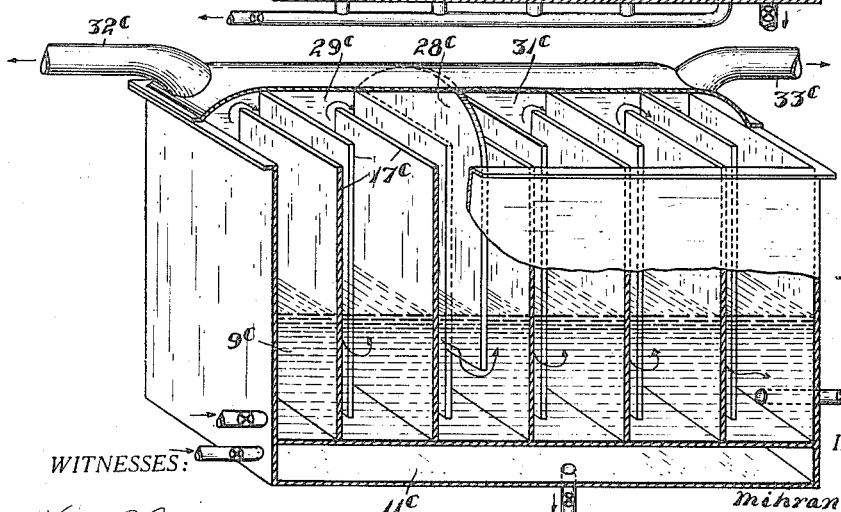

In the accompanying drawing, Figure 1 is a side view of an evaporator by which such method can be carried out, the casing being broken away to show its interior; Fig. 2 is a plan view of the evaporator, the lid being removed; Fig. 3 is a horizontal section on the line 3—3 of Fig. 1; Figs. 4, 5 and 6 are perspective views of modified forms of the invention.

Referring to the drawing, 1 indicates a cylindrical wall of an evaporator, removably closed at the top by a dome-like cover 2. To the bottom 3 of said evaporator is secured, by legs 4, a wall 5 of substantially cylindrical inner chamber 6. This chamber serves no purpose in the apparatus, but its wall 5 is used for supporting parts hereinafter recited. The space between the walls 1 and 5 is divided by a partition 8 into two chambers, an upper chamber 9 for the fruit juices or other liquids to be evaporated, and a lower chamber 11 for steam or other heating fluid. The partition 8 is annular, its inner edge being secured to said wall 5 and its outer edge to the wall 1, and is convoluted, the bends or turns of the convolutions extending radially and horizontally, the upper bends 12 being comparatively narrow or sharp, and the lower bends 13 being much wider.

The liquid to be concentrated is supplied by a pipe 14 to the lowermost portion of the upper chamber 9 near a vertical, radially extending, partition 15, connected to the bottom of one of the bends 13 of the partition 8, its upper convex edge being in close contact with the cover 2. The concentrated liquid is drawn off by a pipe 16 leading from the bottom of said chamber 9, near the partition 15 but on the other side thereof from the pipe 14. A circular series of radial partitions 17 are connected at their inner edges to the wall 5 and at their outer edges to the wall 1, and extend at the bottom to within a short distance of the lower bends 13 respectively of the convoluted partition 8, and at the top above the level of the liquid. Consequently, the liquid, in passing from the pipe 14 to the pipe 16, is compelled to flow in a tortuous path alternately below the bottoms of the partitions 17, and above the narrow bends 12. A window 18 in the wall 1 enables the level of the liquid to be ascertained, and said level can be controlled by regulating the size of the passages through the pipes 14 and 16 by means of valves 19, 20 respectively.

Said liquid in its flow is heated by heat conducted through the partition 8 from the lower chamber 11, which chamber is filled with steam or other heating fluid by means of vertical pipes 21 opening at the top immediately beneath the narrow bends 12 of the partition 8, said pipes leading through the bottom 3 of the evaporator and from a circular pipe 22, which is supplied with steam by a pipe 23. The water condensed from the steam is drawn off by a pipe 24 from the bottom of the chamber 11. The upper chamber 9 may be emptied of liquid, when desired, by means of pipes 26 leading through the wide lower bends 13 of the partition 8 and connected to a circular pipe 27.

An important feature of the evaporator is the provision which I make for collecting and preserving the volatile constituents of the fruit juice or other liquid which, after condensation, may be added to the syrup, instead of allowing said constituents to be wasted as heretofore. For this purpose I divide the upper portion of the chamber 9 into two compartments 29, 31, by means of an extension 28, which fits over the upper edge of one of the radial partitions 17, and extends to the under side of the cover 2, its inner vertical edge fitting closely against the inner vertical edge of the upper portion of the partition 15. From the cover extend two conduits 32 and 33, communicating respectively with the compartments 29, 31, and each preferably connected to a device for producing suction, not shown. The volatile constituents of the fruit juices or other liquids are given out, in general, before the liquid has flowed around the bottom of the first of the series of partitions 17, and said constituents are drawn off by the conduit 32. It may, however, be desirable to place the extension 28 upon the top of the second of said series of partitions 17. After the liquid has passed around the bottom of the first of these partitions, or of the second, as the case may be, practically nothing but water vapor is given off and this is conducted away by the conduit 33, the residual liquid becoming progressively less fluid as it flows to the pipe 16, by which it is finally drawn off.

In the modification of the evaporator shown in Figs. 4, 5 and 6, the chamber is rectangular instead of cylindrical.

In the form of the invention shown in Fig. 4 the convolutions at the bottom, as also the partitions $17^a$ corresponding to the partitions 17 in the first described form of the invention, are made parallel with each other, on one of said partitions $17^a$ being an extension $28^a$ performing the same function as the partition 28. The conduit $32^a$ leads from the space above the first two upper convolutions, and the conduit $33^a$ leads from the upper space of the rest of the apparatus. Like changes in arrangement are made in other portions of the apparatus, and the mode of operation of this form of the evaporator will be readily understood.

In the form of the evaporator shown in Fig. 5, instead of the liquid flowing over a series of upper convolutions at the bottom and under a series of partitions, it flows through U-shaped pipes 41 which depend into a steam chamber $11^b$, a horizontal partition $8^b$ dividing said lower steam chamber $11^b$ from an upper liquid chamber $9^b$, one end of each pipe connecting with said upper liquid compartment on one side of a partition $17^b$ corresponding to a partition 17 in the first described form of the evaporator, and the other end opening into said liquid chamber on the other side thereof. In passing through said U-shaped pipe the liquid is heated and gives off vapor, the vapors of the volatile essences being collected, in like manner as before, in a compartment $29^b$ formed by an extension $28^b$ and drawn off by a conduit $32^b$, and the water vapor being collected by a conduit $33^b$.

In the form of the evaporator shown in Fig. 6 the liquid is caused to flow in a sigzag or tortuous path around the free edges of vertical walls $17^c$ extending alternately from opposite sides of a liquid chamber $9^c$ each to within a short distance of the other side. Beneath the liquid chamber is a heating chamber $11^c$. On one of the partitions $17^c$ is an extension $28^c$ extending downwardly on one side below the level of the liquid forming compartments $29^c$ and $31^c$ communicating respectively with conduits $32^c$ and $33^c$. The mode of operation of this form of the evaporator will be readily understood. It will be seen that in all these forms of the evaporator I concentrate the liquid by causing it to flow in a continuous stream evaporating the liquid and separately removing, condensing and adding to the concentrated liquid resulting from said evaporation a vapor first evaporated from the liquid.

I claim:—

The method of concentrating liquids containing essential or aromatic ingredients, which consists in causing liquid to flow in a continuous stream, evaporating the liquid, and separately removing, condensing, and adding to the concentrated liquid resulting from the whole of the evaporation, the vapor first evaporated from the liquid.

In testimony whereof I have hereunto set my hand in the presence of two subscribing witnesses.

MIHRAN K. SERAILIAN.

Witnesses:
 FRANCIS M. WRIGHT,
 D. B. RICHARDS.